(12) United States Patent
Marden et al.

(10) Patent No.: US 9,524,191 B2
(45) Date of Patent: *Dec. 20, 2016

(54) APPARATUS INCLUDING A STALL COUNTER TO BIAS PROCESSING ELEMENT SELECTION, AND MASKS TO ALLOCATE RESERVATION UNIT ENTRIES TO ONE OR MORE PROCESSING ELEMENTS

(75) Inventors: Morris Marden, Hillsboro, OR (US);
Matthew Merten, Hillsboro, OR (US);
Alexandre Farcy, Hillsboro, OR (US);
Avinash Sodani, Portland, OR (US);
James Hadley, Portland, OR (US);
Ilhyun Kim, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/941,637

(22) Filed: Nov. 8, 2010

(65) Prior Publication Data
US 2011/0055524 A1 Mar. 3, 2011

Related U.S. Application Data

(62) Division of application No. 11/784,864, filed on Apr. 9, 2007, now Pat. No. 8,521,993.

(51) Int. Cl.
*G06F 9/50* (2006.01)
*G06F 9/30* (2006.01)
*G06F 9/38* (2006.01)

(52) U.S. Cl.
CPC ............. *G06F 9/50* (2013.01); *G06F 9/30101* (2013.01); *G06F 9/3851* (2013.01)

(58) Field of Classification Search
CPC ....... G06F 9/30101; G06F 9/3851; G06F 9/50
USPC .................................................. 712/217, 220
See application file for complete search history.

(56) References Cited

U.S. PATENT DOCUMENTS

| | | | |
|---|---|---|---|
| 5,752,031 A | 5/1998 | Cutler et al. | |
| 5,987,598 A | 11/1999 | Levine et al. | |
| 6,233,599 B1 * | 5/2001 | Nation et al. ................. | 718/102 |
| 6,535,905 B1 | 3/2003 | Kalafatis et al. | |
| 6,697,935 B1 | 2/2004 | Borkenhagen et al. | |
| 6,898,694 B2 * | 5/2005 | Kottapalli et al. ............ | 712/207 |
| 6,980,439 B2 | 12/2005 | Schultz et al. | |
| 7,401,207 B2 | 7/2008 | Kalla et al. | |

(Continued)

OTHER PUBLICATIONS

Chou et al., "A Realistic Study on Multithreaded Superscalar Processor Design", Euro-Par '97 Proceedings of the Third International Euro-Par Conference on Parallel Processing, Springer-Verlag London, UK 1997, pp. 1092-1101.*

(Continued)

*Primary Examiner* — David J Huisman
(74) *Attorney, Agent, or Firm* — Nicholson De Vos Webster & Elliott LLP (57) ABSTRACT

A method and apparatus for providing fairness in a multi-processing element environment is herein described. Mask elements are utilized to associated portions of a reservation station with each processing element, while still allowing common access to another portion of reservation station entries. Additionally, bias logic biases selection of processing elements in a pipeline away from a processing element associated with a blocking stall to provide fair utilization of the pipeline.

12 Claims, 5 Drawing Sheets

(56) References Cited

U.S. PATENT DOCUMENTS

| | | |
|---|---|---|
| 8,438,369 B2 * | 5/2013 | Marden et al. ............... 712/220 |
| 8,521,993 B2 * | 8/2013 | Marden et al. ............... 712/220 |
| 2003/0233394 A1 | 12/2003 | Rudd et al. |
| 2005/0125795 A1 | 6/2005 | Kissell |
| 2006/0006987 A1 | 1/2006 | Hashimoto et al. |
| 2006/0026473 A1 | 2/2006 | Patrick Tan |
| 2006/0069874 A1 | 3/2006 | Desai |
| 2006/0184946 A1 | 8/2006 | Bishop et al. |
| 2006/0218559 A1 | 9/2006 | Ahmed et al. |
| 2007/0294694 A1 | 12/2007 | Jeter et al. |
| 2008/0040554 A1 | 2/2008 | Zhao et al. |
| 2008/0075101 A1 | 3/2008 | Illikkal et al. |
| 2008/0082796 A1 | 4/2008 | Merten et al. |
| 2008/0162868 A1 | 7/2008 | Glew |

OTHER PUBLICATIONS

Cazorla et al., "Predictable Performance in SMT Processors: Synergy between the OS and SMTs", IEEE Transactions on Computers, vol. 55, No. 7, Jul. 2006, pp. 785-799.

Cazorla et al., "QoS for High-Performance SMT Processors in Embedded Systems",IEEE Micro, vol. 24, No. 4, Jul.-Aug. 2004, pp. 24-31.

* cited by examiner

APPARATUS INCLUDING A STALL COUNTER TO BIAS PROCESSING ELEMENT SELECTION, AND MASKS TO ALLOCATE RESERVATION UNIT ENTRIES TO ONE OR MORE PROCESSING ELEMENTS

CROSS-REFERENCE TO RELATED APPLICATION

This application is a Divisional of U.S. patent application Ser. No. 11/784,864, filed on Apr. 9, 2007, entitled "PROVIDING THREAD FAIRNESS IN A HYPER-THREADED MICROPROCESSOR". This application is incorporated herein by reference in its entirety.

FIELD

This invention relates to the field of processors and, in particular, to providing resource fairness for processing elements.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, threads, and/or logical processors.

In processors with multiple threads, the behavior of one thread potentially affects the behavior of another thread on the same processor core due to sharing of resources and pipelines. Often behavior of one thread creates unfairness in the usage of the shared resources and pipelines. In fact, when one thread's performance significantly changes in relation to other threads on the same core, often a large and unpredictable variability in performance from the unbalanced usage of shared resources occurs.

For example, a reservation unit in a microprocessor is used to buffer instructions with corresponding operands for scheduling on execution units. In an out-of-order (OOO) processor, instructions may be scheduled out of order on execution units; however, some instructions are dependent on other instructions. As a result, when one thread schedules a long latency operation, such as a load operation that misses a cache, instructions that are dependent on the long latency operation reside in the reservation unit, while other threads operations are efficiently de-allocated. This results in the reservation station being monopolized by the thread that scheduled the long latency operation, which potentially adversely affects the ability of other threads on the same core to schedule operations for execution.

In addition, during some stages of a processor pipeline, one thread may cause a stall, which does not allow other threads to continue processing during the stall. This behavior is often referred to as a blocking stall. As a result, one thread's stall potentially adversely affects other threads performance in the pipeline.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific bias logic embodiments to provide fairness between processing elements, specific processor organization, specific pipeline stages, etc. in order to provide a thorough understanding of the present invention. It will be apparent, however, to one skilled in the art that these specific details need not be employed to practice the present invention. In other instances, well known components or methods, such as different varieties of pipelines, stall detection, processing element identification, processing element selection, and specific operational details of microprocessors, have not been described in detail in order to avoid unnecessarily obscuring the present invention.

The method and apparatus described herein are for sharing providing fairness between processing elements. Specifically, providing fairness is primarily discussed in reference to a microprocessor with multiple threads. However, the methods and apparatus for providing fairness are not so limited, as they may be implemented on or in association with any integrated circuit device or system, such as cell phones, personal digital assistants, embedded controllers, mobile platforms, desktop platforms, and server platforms, as well as in conjunction with any type of processing element, such as a core, hardware thread, software thread, logical processor, or other processing element.

Figure 1:
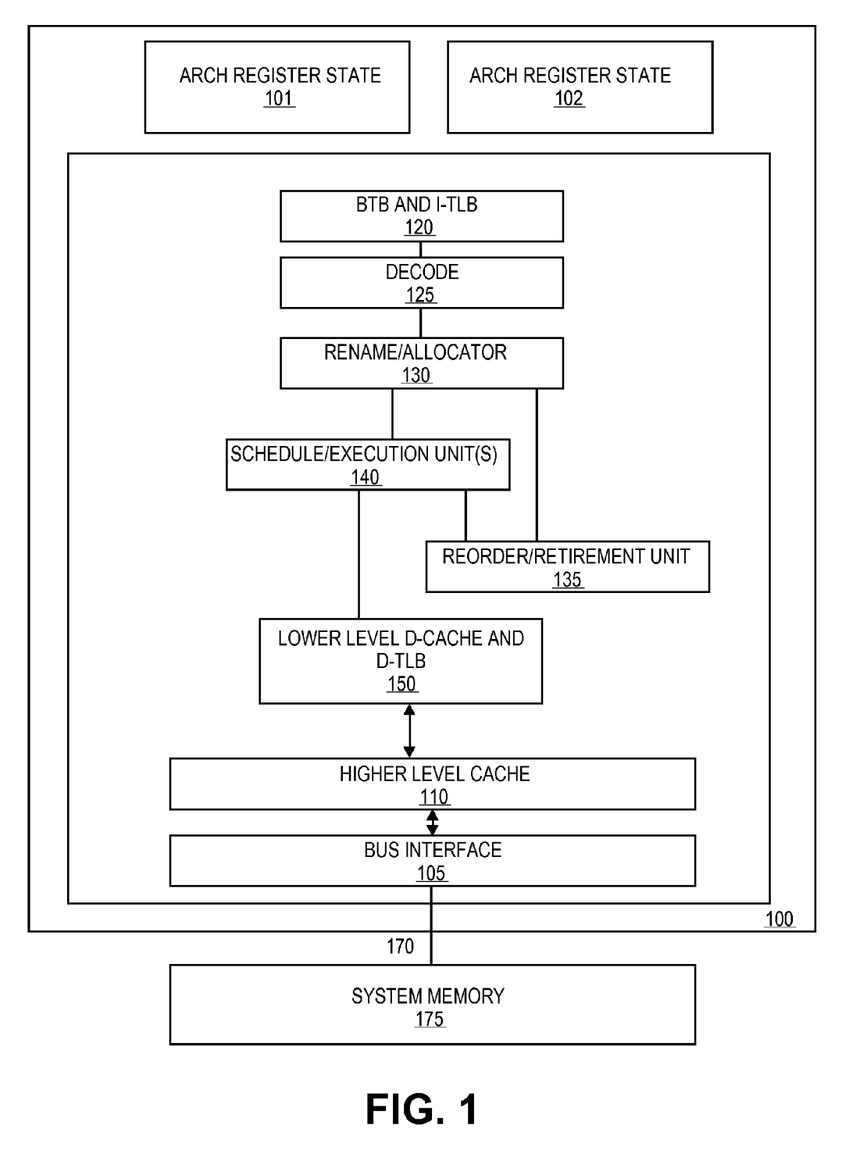
FIG. 1 illustrates an embodiment a multi-resource processor capable of providing fair sharing of shared resources amongst multiple processing elements.

Referring to FIG. 1, an embodiment of a processor capable of providing fairness between two processing elements is illustrated. A processing element refers to a thread, a process, a context, a logical processor, a hardware thread, a core, and/or any processing element, which shares access to other shared resources of the processor, such as reservation units, execution units, pipelines, and higher level caches/memory. A physical processor typically refers to an integrated circuit, which potentially includes any number of other processing elements, such as cores or hardware threads.

A core often refers to logic located on an integrated circuit capable of maintaining an independent architectural state, such as arch state 101 and 102, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources, that share access to shared resources of a processor, such as a shared pipeline or shared reservation unit/station.

In one embodiment, processor 100 is a multi-threaded processor capable of executing multiple threads in parallel. Here, a first thread is associated with architecture state registers 101 and a second thread is associated with thread 102. Therefore, below thread 101 and 102 refer to the first and second threads, respectively. Thread 101 and 102 share access to a reservation unit(s), which may be distributed in processor 100 or located in units, such as scheduler/execution module 140 or rename/allocater module 130. As discussed below, in one embodiment, portions of the reservation unit(s) are capable of being dedicated to each thread, shared amongst both threads, or reserved, i.e. not associated with either thread.

In addition, a pipeline or portion of a pipeline, such as a front-end or instruction decode portion of the pipeline, is shared by threads 101 and 102. Here, the pipeline or the portion of the pipeline, in one embodiment, is capable of providing fairness between threads 101 and 102 through biasing thread selection in response to blocking stalls within the pipeline.

As illustrated, architecture state registers 101 are replicated in architecture state registers 102, so individual architecture states/contexts are capable of being stored for logical processor 101 and logical processor 102. Other smaller resources, such as instruction pointers and renaming logic in rename allocater logic 130 may also be replicated for threads 101 and 102. Some resources, such as re-order buffers in reorder/retirement unit 135, ILTB 120, load/store buffers, and queues may be shared through partitioning. While resources, such as general purpose internal registers, page-table base register, low-level data-cache and data-TLB 150, execution unit(s) 140, and out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode instructions. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, thread 101 is potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

In FIG. 1, processor 100 is illustrated as a microprocessor with two logical processors, i.e. two hardware threads, where certain shared resources, such as a reservation unit and a pipeline, which are capable of providing fairness between the two threads. However, processor 100 is not so limited. For example, processor 100 may be any processing element, such as an embedded processor, cell-processor, microprocessor, or other known processor, which includes any number of multiple cores/threads capable of executing multiple contexts, threads, virtual machines, etc.

Moreover, an oversimplified illustrative microarchitecture of an out-of-order of processor is illustrated for processor 100. However, any of the modules/units illustrated in processor 100 may be configured in a different order/manner, may be excluded, as well as may overlap one another including portions of components that reside in multiple modules. For example, a reservation unit may be distributed in processor 100 including multiple smaller reservation tables in different modules of processor 100.

Figure 2:
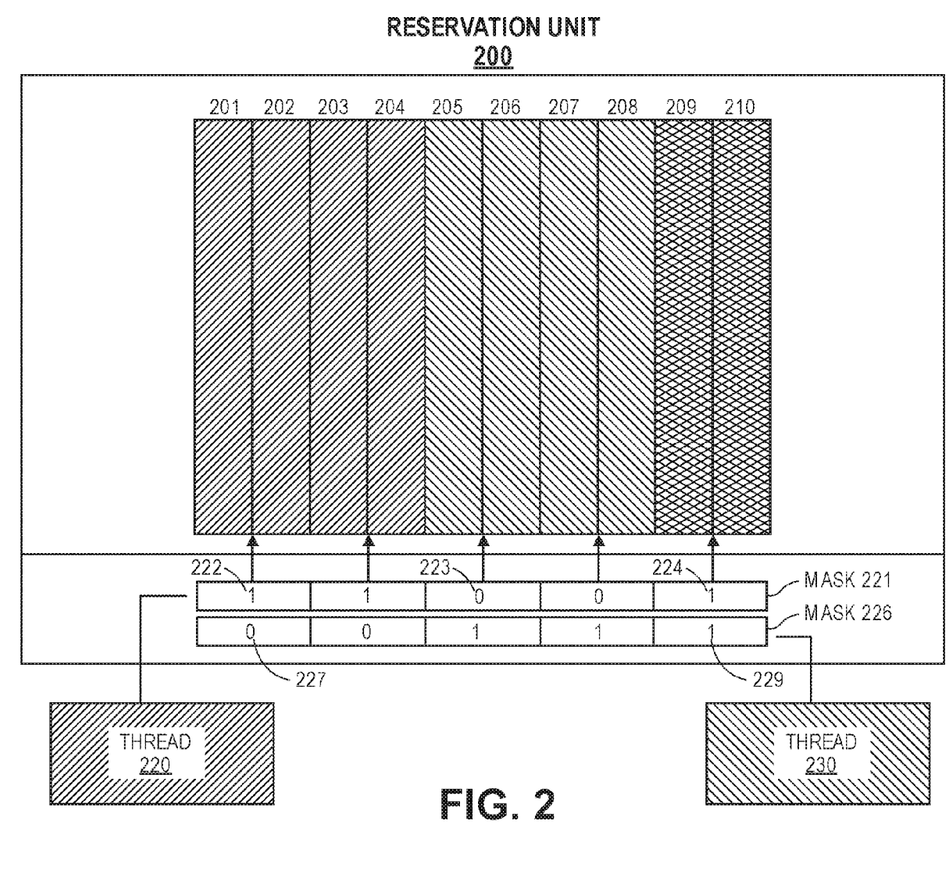
FIG. 2 illustrates an embodiment of a reservation unit capable of dedicating entries to processing elements.

Turning to FIG. 2, an embodiment of a reservation unit capable of providing fairness between processing elements that share access to the reservation unit is illustrated. Here, reservation unit 200 includes reservation entries 201-210. As an example, reservation unit includes 36 entries; however, any number of entries may be included. An exemplary range of entries include a range of 8 entries to 128 entries.

In one embodiment, reservation entries are to hold instruction information. Note that in many architectures, instructions are broken down into multiple micro-operation (micro-ops). As a result, the use of instruction information also includes micro-op information. Examples of instruction information include reservation information, dependency information, instruction identification information, result information, scheduling information, and any other information associated with instructions or micro-operations, reservation of resources, and/or reservation entries.

For example, if a first entry referencing a first instruction is dependent upon a second instruction, the first entry includes dependency information to indicate it is dependent on the second instruction. As a result, the first instruction is not scheduled for execution until after the second instruction. Furthermore, the result from the second instruction may be held in a second entry, which is accessed when the instruction referenced in the first entry is scheduled for execution.

Processing elements 220 and 230 share access to reservation unit 200. Thread 220 is associated with storage element 221 and thread 230 is associated with storage element 226. In one embodiment, storage elements 221 and 226 are registers not visible to a hypervisor or operating system. In another embodiment, storage elements 221 and 226 are masking registers that are potentially visible to users as machine specific registers (MSRs); however, they may also be masking registers not visible at a user level and may only be visible to executives such as an operating system, hypervisor, or BIOS. An entry or field in mask 221 is associated with a first number of reservation entries. As illustrated, field 222 is associated with two entries, i.e. 201 and 202. However, a field or any number of bits/fields may be associated with any number of reservation entries. As an example, a one to one relationship may exist between fields and entries or a one to two, three, four, eight, or other ratio may exist between fields and entries.

Here, when field 222 holds a first value, such as a logical one, entries 201 and 202 are associated with thread 220. In other words, when field 222 holds the first value, thread 220 may utilize entries 201 and 202 in reservation unit 200. Furthermore, when an entry, such as entry 223 holds a second value, such as a logical zero, thread 220 is not associated with corresponding entries 205 and 206. As a result, thread 220 is not able to utilize entries 205 and 206.

Second storage element 226 is associated with thread 230. Similar to field 222, field 227 is also associated with entries 201 and 202. However, as illustrated, field 227 holds a second value, i.e. a logical zero, to indicate that thread 230 is not associated with entries 201 and 202. In other words, entries 201 and 202 are dedicated to thread 220, as field 222 indicates thread 220 may access entries 201 and 202, while entry 227 indicates that thread 230 may not access entries 201 and 202.

As illustrated, the combination of mask 221 and 226 indicates that entries 201-204 are dedicated to thread 220, entries 205-208 are dedicated to thread 230, and entries 209-210 are associated with both threads 220 and thread 230. Consequently, if thread 230 encounters a long latency instruction, then thread 230 is only able to utilize entries 205-210, instead of filling up reservation unit 200 with dependent instructions. Therefore, thread 220 is still able to utilize dedicated entries 201-204, instead of thread 230 monopolizing all of reservation unit 200 adversely affecting thread 220's performance. As can be seen, reservation unit 200 provides fairness by ensuring processing elements have at least some number of entries available to each processing element.

Also note that mask 221 and 226 may be dynamically updated. For example, upon spawning a new thread entries may be dynamically dedicated to the new thread. Inversely, when killing a thread, dedicated entries may be de-allocated from that thread and returned to the common use pool, which currently includes entry 209-210, or dedicated to another processing element. Furthermore, entries may be reserved for debugging or other purposes from both processing elements. Although not shown, if entry 224 and 229 both included logical zeros, then thread 220 and thread 230 are not associated with entries 209-210.

In another embodiment, storage elements 221 and 226 are counters that hold a number of entries currently usable by threads 101 and 102, respectively. When allocating new instructions or micro-operations into reservation unit 200, a thread is allocated entries when a current number of entries in use are below a threshold value. Upon allocating entries, the counters are incremented, and upon de-allocating the entries, the counters are decremented.

Above, examples utilized a logical one and a logical zero as first and second values, respectively. However, any values may be held in fields to indicate an associated resource is or is not associated with reservation entries. Furthermore, there may be any number of storage elements associated with any number of processing elements, which are illustrated as threads, but may include any resource that shares access to reservation unit 200.

Figure 3:
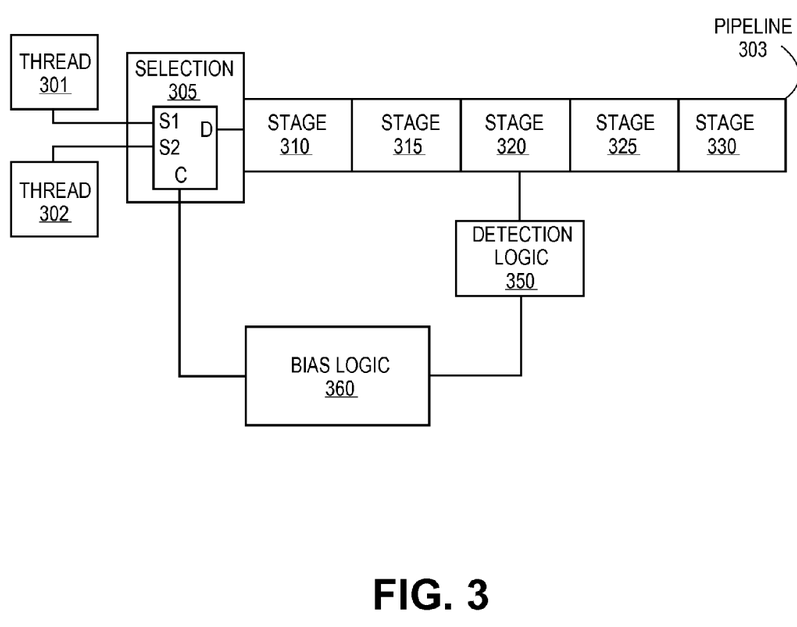
FIG. 3 illustrates an embodiment of a pipeline capable of biasing processing element selection in response to stalls in the pipeline.

Turning to FIG. 3, an embodiment of a pipeline capable of providing fairness between processing elements is illustrated. A pipeline often refers to a number of elements or stages coupled together in series, wherein the output of one stage is the input of a next stage. For example, an oversimplified pipeline includes four stages: fetch, decode, out of order execution, and retire. Note that pipeline 303 includes any number of stages. In addition, pipeline 303 may represent a portion of a pipeline, such as a front-end portion, back-end portion, or other portion, as well as an entire pipeline. Stages 305-330 include any known pipeline stages, such as resource selection, instruction decode, allocation, rename, execution, retire, or other pipeline stage.

Often stalls in pipeline 303 affect both performance of individual processing elements, as well as fairness between processing elements. Non-blocking stalls in pipeline 303 potentially allow processing by other processing elements to continue or to interrupt the stall. Therefore, with a non-blocking stall associated with thread 301, thread 302 may still use pipeline 303, so no biasing is needed to provide fairness. A blocking stall, however, typically refers to a stall or delay in a stage of a pipeline, which blocks execution of other processing elements in the stage. Here, a blocking stall block blocks execution in the stage on both threads 301 and 302, which potentially adversely affects fairness between threads 301 and 302.

Previously, selection logic 305 alternates selection of thread 301 and 302 for further processing in pipeline 303.

Consequently, in response to a blocking stall on thread 301, bias logic 360 biases selection logic 305 away from selecting thread 301 for a period of time or a number of cycles to compensate for the blocking stall.

For example, assume stage 320 is an instruction length decoder (ILD) stage. Typically, common length instructions are decoded quickly, such as determining the start and end of instruction in a single block of data bytes within a single cycle. However, when a length changing prefix (LCP) is detected a slower length decode process is invoked. As an illustrative example, a single block of instructions are decoded unit by unit, which results in a stall of a number of cycles, such as seven cycles. Here, assume the LCP is associated with thread 301. Therefore, as the slower decode process is not to be interrupted, stage 320 is blocked, i.e. other processing elements, such as thread 302, are not able to determine decode lengths of instruction in stage 320 for the number of cycles of the blocking stall. Essentially, thread 301 blocks pipeline 303 for a number of cycles.

Consequently, bias logic 360 is to bias selection in stage 305 to provide fairness in pipeline 303. Continuing the example from above, a blocking stall associated with thread 301 is detected with detection logic 350. Detection logic 350 may be independent logic for detecting stalls or logic within a stage for detecting a stall event. For example, logic to detect a Length Changing Prefix (LCP) may be part of detection logic 350, as it detects a blocking stall event. Here, assume the blocking stall last for seven execution cycles.

As a result, bias logic biases selection logic 305 away from thread 301 for a period of time or for a number of cycles after the blocking stall has concluded to provide fair access for thread 302 to pipeline 303. For example, bias logic 360 biases selection logic 305 to select thread 302, i.e. away from thread 301, for the next seven cycles. However, thread 302 may be selected for any number of cycles to provide fairness depending on the implementation.

Selecting away from thread 301, i.e. biasing selection more toward thread 302, is to provide more access for thread 302 to pipeline 303 to make up for the stall cycles thread 301 monopolized pipeline 303. As shown, providing fairness through biasing selection 305 may take place subsequent to a blocking stall's conclusion. Since the goal is to ensure reasonably equal access to pipeline 303 over time, biasing selection logic 305 may take place immediately subsequent to completion of a blocking stall or during subsequent cycles.

In an alternate embodiment, biasing selection 305 away from thread 301 begins immediately after detection logic 350 detects the beginning of a blocking stall associated with thread 301. For example, pipe stages 310 and 315 are cleared or flushed and thread 302 is allowed to advance into stages 310 and 315 behind the blocking stall in stage 320. Therefore, if stages 310 and 315 previously includes thread 301 information, recovering fairness may being earlier by allowing thread 302 to populate stages 310 and 315 immediately after the blocking stall is detected.

Providing fairness may, but does not necessarily, equate to equal time or cycles for each thread in pipeline 303. For example, if thread 301 creates a blocking stall that lasts seven cycles, then theoretically, bias logic 360 should bias toward thread 302 for seven cycles. However, in one embodiment, biasing away from thread 301 or toward 302 includes any amount of biasing. To illustrate, after a seven cycle blocking stall, bias logic 360, depending on the implementation may bias toward thread 301 for an extra four cycles, instead of the seven. Also note that the bias algorithm utilized by bias logic 360 may be statically set for stalls of known length and dynamically adjustable for stalls of unknown length. In one embodiment, biasing away from a first processing element includes representing selection of other processing elements more often than the first processing element.

Also note that the example above assumes thread 301 and 302 have activity available for selection each cycle. Therefore, in one embodiment, bias logic 360 is to bias selection logic 305, not to force selection logic 305 to select a processing element. For example, assume bias logic 360 outputs values to suggest or bias selection logic 305 for selection of thread 302 six out of eight cycles, as discussed above. However, if thread 302 has no activity for those cycles, while thread 301 does have activity for the eight cycles, then selection logic 305 may select thread 301, as not to waste execution cycles.

Figure 4:
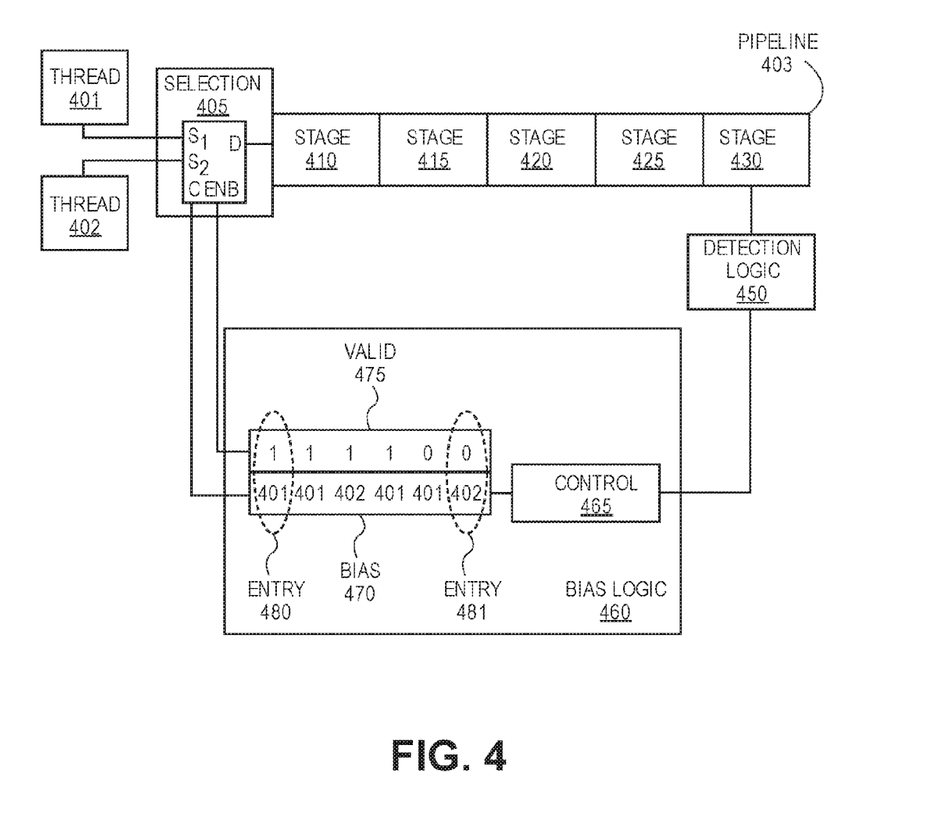
FIG. 4 illustrates an embodiment of bias logic to provide Quality of Service QoS to processing elements.

Referring next to FIG. 4, an embodiment of bias logic to provide fairness in a pipeline is illustrated. Similar to FIG. 3, pipeline 403 includes stages 410-430 and detection logic 450 to detect a blocking stall, such as a Length Change Prefix (LCP) in an Instruction Length Decode (ILD) stage. Here, detection logic 450 detects a blocking stall associated with thread 402. Control 465 sets storage elements 470 and 475 to bias selection 405 in response to detecting the blocking stall.

In one embodiment, a blocking stall, such as an LCP blocking stall, results in a stall for a specific set number of cycles, such as seven cycles. Here, control 465 sets bias storage element 470 to a predefined pattern to bias selection logic 405. As shown, bias element 470 includes 6 bits; however, any size element may be used. For example, bias element 470 is a 16 bit shift register to hold a bit pattern representing a repeated bias of thread 401 twice and 402 once. In this example, bias logic 460 is capable of biasing selection logic 405 for up to 16 cycles of the shift register.

In one embodiment, the pattern is determined by control 465 XORing a bias value with a thread ID of thread 402, which is associated with the stall. As a first example, the XOR is performed on the load of bias element 470. As another example, the XOR is performed on the output of bias element 470. In addition to the bias value/pattern loaded in bias storage element 470, corresponding valid values are loaded in valid storage element 475. Valid element 475 includes fields corresponding to bias/thread fields 470 to form entries, such as head entry 480 and tail entry 481.

To illustrate, assume a seven cycle blocking stall associated with a LCP from thread 402 is detected. A pattern, such as 001001, is loaded in bias element 470 and 111111, is loaded in valid element 475. Here, a logical value of 0 held in a thread field of bias element 470 represents thread 401, while a logical value of 1 represents thread 402. Additionally, a one held in valid element 475 represents the corresponding bias field is valid and a 0 represent invalid. During a subsequent cycle, head entry 480 is shifted out to selection logic 405. Entry 480 currently holds a logical 0 representing thread 401 and a logical 1 representing the bias is valid. As a result, selection 405, selects thread 401 in response to the thread value indicating thread 401 and the valid value indicating the thread value is valid.

In addition to shifting out entry 480, in one embodiment, a zero is shifted into tail entry 481 of valid element 475 to indicate tail entry 481 is now invalid. Selection continues with thread 401, 402, 401, 401, and 402, assuming during each of these cycles the selected thread has activity to be selected. If a thread, such as thread 401, does not have any activity during a cycle bias logic 460 indicates thread 401 is to be selected, then thread 402 may be selected to ensure pipeline 403 is efficiently utilized.

Now, assume the valid field in entry 480 holds a logical zero. When entry 480 is now shifted out to selection logic 405, the bias field is determined to be not valid. Consequently, selection logic 405 is able to make a normal selection between thread 401 and 402. In one embodiment, selection logic 405 normally selects the opposite of the thread selected last cycle.

Figure 5:
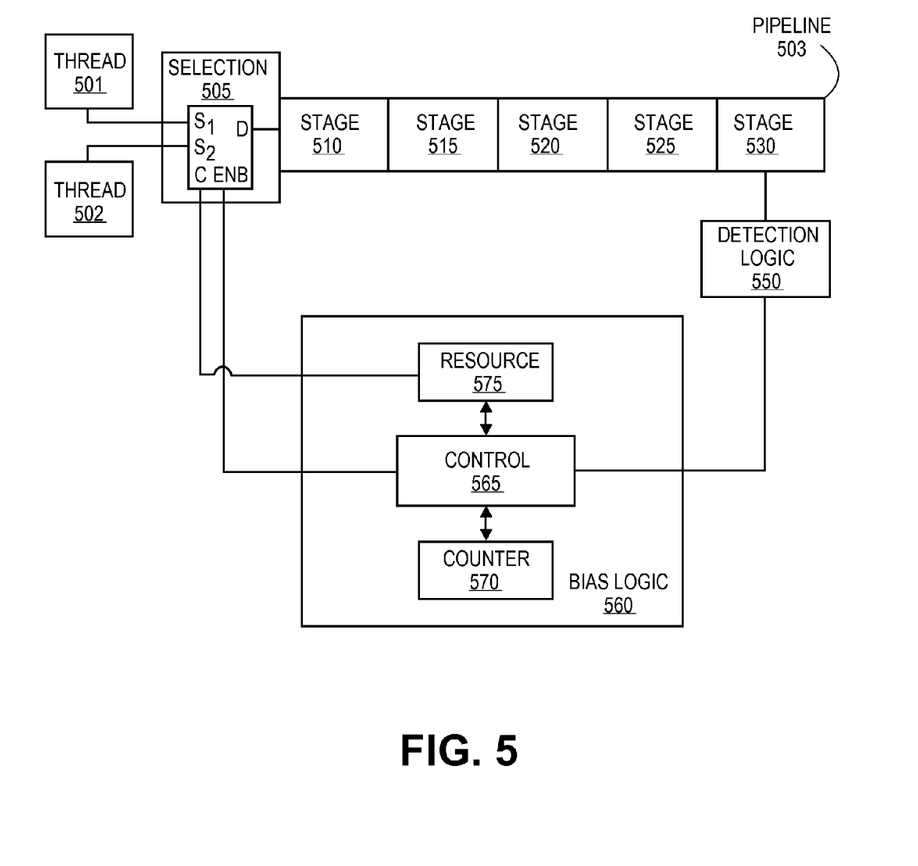
FIG. 5 illustrates another embodiment of bias logic to provide Quality of Service QoS to processing elements.

Next, FIG. 5 illustrates another embodiment of bias logic to bias away from selection in a pipeline of a processing element associated with a blocking stall for providing fairness in the pipeline. As illustrated, threads 501 and 502 share access to pipeline 503 including stages 510 through 530. As an example, stage 530 contains an instruction allocator that maintains the mapping of the thread's architectural register state to the internal physical registers. Detection logic 550 is to detect a blocking stall. Additional examples of blocking stalls include a partial register stall, such as a write to a subset of a register and a subsequent read of the entire register, and a branch stall to recover the architecture to physical register mapping after a mispredicted branch. Often these examples of blocking stalls are seen in an instruction queue read stage and/or stages of an allocation pipeline. In one embodiment, these examples of blocking stalls are variable in length, such as from 1 cycle up to 25 cycles and potentially larger. In the embodiment illustrated in FIG. 4, a variable pattern may be loaded in bias element 470 to compensate for the variable length stalls.

However here, counter 570 and corresponding resource field 575 are utilized to bias selection of threads in stage 505. In one embodiment, counter 570 is to be set to a default value of zero. In response to detecting a blocking stall in stage 530, counter 570 is updated in a first direction, such as incrementing the counter, for each cycle of the blocking stall. Note the counter may be set to a default integer value greater than zero and decremented. In one embodiment, resource field 575 is to store a value representing the processing element that is associated with the stall. For example, if a branch misprediction is associated with thread 501, resource 575 is to hold a thread ID or other value representing thread 501. In an alternative embodiment, resource 575 is to hold a value representing a resource to be selected based on which resource the stall is associated with. For example, if a branch misprediction is associated with thread 501, then resource 575 is to hold a value representing thread 502, as thread 502 is to be selected more often to provide fairness in pipeline 503.

Below in Table 1 is an example of operation of counter 570 to illustrate operation of counter 570, control 565, and resource field 575. In the first cycle, a blocking stall, such as a partial register or branch misprediction stall is detected on thread 502. For each of the 5 cycles of the stall, control 565 increments counter 570, i.e. in the first cycle from 0 to 1, and so on, to a counter value of 5. Control logic 565 loads resource field 575 with a value to represent thread 501, which is the thread to be selected in order to provide fairness in response to the stall associated with thread 302.

After the blocking stall is complete in cycle 5, selection logic 505 selects thread 501 based on the thread/bias value from resource 575. In response to selecting thread 501 in cycles 6-8, counter 570 is decremented each selection by control 565 to a value of two. In cycle 9, thread 501 is associated with a blocking stall. However, instead of incrementing counter 570 for each cycle, control 565 realizes thread 501 is identified in resource field 575. Therefore, a stall for cycle 9 by thread 501 is permitted due to the unfairness of the previous stall by thread 502, which has not been fully compensated for. As a result, the value held in counter 570 is decremented in cycle 9 and 10. When the counter reaches the default value of 0, the counter begins to increment again. However, now control 565 sets resource field 575 to represent thread 502 to bias selection logic 505 away from thread 501. Upon completion of the stall, selection logic 505 selects thread 502 and control 565 decrements counter 570 until counter 570 reaches zero. Once at zero, selection logic 505 may return to normal selection.

TABLE 1

Illustrative embodiment of bias counter

| Cycle | Event | Counter # | Resource # |
|---|---|---|---|
| 1 | Thread 502 5 cycle stall | 1 | 501 |
| 2 | | 2 | 501 |
| 3 | | 3 | 501 |
| 4 | | 4 | 501 |
| 5 | | 5 | 501 |
| 6 | Select thread 501 | 4 | 501 |
| 7 | Select thread 501 | 3 | 501 |
| 8 | Select thread 501 | 2 | 501 |
| 9 | Thread 501 5 cycle stall | 1 | 501 |
| 10 | | 0 | |
| 11 | | 1 | 502 |
| 12 | | 2 | 502 |
| 13 | | 3 | 502 |
| 14 | Select thread 502 | 2 | 502 |
| 15 | Select thread 502 | 1 | 502 |
| 16 | | 0 | |

As illustrated above, fairness is provided by shared resources, such as reservation stations and pipelines, for processing elements, such as threads on a core. Instead of a long latency instruction and a chain of dependent instructions monopolizing a reservation station, portions of the reservation station may be allocated/dedicated to processing elements to ensure each processing element is able to continue operation. In addition, instead of a blocking stall monopolizing a pipeline and then returning to alternating processing element selection, bias logic biases the selection logic to provide fairness between processing elements over time.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   an execution unit to execute a plurality of instructions;
   a reservation unit coupled to the execution unit, the reservation unit to hold the plurality of instructions for scheduling and to hold instruction information associated with the plurality of instructions in a plurality of reservation entries, wherein the instruction information is to include dependency information and scheduling information, wherein the dependency information is to indicate that a first instruction depends from a second instruction, and wherein the scheduling information is to indicate that the first instruction should not be scheduled for execution until after the second instruction;
   a first storage element to include a first mask field associated with a first number of reservation entries of the plurality of reservation entries, the first mask field, when holding a first value, to indicate the first number of reservation entries are associated with a first processing element;
   a second storage element to include a second mask field associated with the first number of reservation entries, wherein:
      when the first mask field holds the first value and the second mask field holds the first value, the first number of reservation entries are associated with the first processing element and a second processing element,
      when the first mask field holds the first value and the second mask field holds a second value, the first number of reservation entries are associated with the first processing element and not with the second processing element,
      when the first mask field holds the second value and the second mask field holds the second value, the first number of reservation entries are not associated with the first processing element and are not associated with the second processing element, and
      when the first mask field holds the second value and the second mask field holds the first value, the first number of reservation entries are associated with the second processing element and not with the first processing element; and
   a counter to be updated upon encountering a stall associated with either of the first and second processing elements, the counter to update in a first direction during each cycle that the stall exists, wherein during the stall a resource field is set to indicate that the processing element that is not experiencing the stall is to be selected over the processing element that is experiencing the stall, and wherein upon an exit from the stall the counter is to update in a second, opposite direction and the resource field is to be set to indicate that the processing element that had experienced the stall is to be selected over the processing element that had not experienced the stall wherein when the counter is reset to a default condition normal processing element selection is resumed.

2. The apparatus of claim 1, wherein the first processing element is selected from a group consisting of a thread, a logical processor, and a core.

3. The apparatus of claim 1, wherein the instruction information includes a plurality of information elements, wherein each of the plurality of information elements are selected from a group consisting of instruction identification information and result information.

4. The apparatus of claim 1, wherein the first number of reservation entries is an even number of entries.

5. The apparatus of claim 1, wherein the first and second storage elements are registers.

6. The apparatus of claim 1, wherein the first and second storage elements are not visible to a hypervisor.

7. The apparatus of claim 1, wherein the first and second storage elements are not visible to an operating system.

8. The apparatus of claim 1, wherein the first and second storage elements are visible to a user as machine specific registers.

9. An apparatus comprising:
   first architecture state logic to hold a first architecture state for a first thread;
   second architecture state logic to hold a second architecture state for a second thread;
   one or more execution units to execute a plurality of instructions;
   a reservation unit coupled to the one or more execution units, the reservation unit including a number of reservation entries configured to hold the plurality of instructions for scheduling on the one or more execution units for execution and to store instruction information, wherein the instruction information includes dependency information and scheduling information, wherein the dependency information indicates that a first instruction depends from a second instruction, and wherein the scheduling information indicates that the first instruction should not be scheduled for execution until after the second instruction;
   a first storage element to hold a first pattern of values;
   a second storage element to hold a second pattern of values; and
   a control logic circuit coupled to the first storage element, the second storage element, and the reservation unit, the control logic circuit to allow instructions of the plurality of instructions associated with the first thread to be held in a first plurality of reservation entries of the number of reservation entries and not to be held in a second plurality of reservation entries based on the first pattern of values to be held in the first storage element, and to allow instructions of the plurality of instructions associated with the second thread to be held in a third plurality of reservation entries of the number of reservation entries and not to be held in a fourth plurality of reservation entries based on the second pattern of values to be held in the second storage element; and
   a counter to be updated upon encountering a stall associated with either of the first and second processing elements, the counter to update in a first direction during each cycle that the stall exists, wherein during the stall a resource field is set to indicate that the processing element that is not experiencing the stall is to be selected over the processing element that is experiencing the stall, and wherein upon an exit from the stall the counter is to update in a second, opposite direction and the resource field is to be set to indicate that the processing element that had experienced the stall is to be selected over the processing element that had not experienced the stall wherein when the counter is reset to a default condition normal processing element selection is resumed.

10. The apparatus of claim 9, wherein the first and second storage elements are configured to be dynamically updateable during runtime to update the first pattern and the second pattern.

11. The apparatus of claim 9, wherein the first plurality of reservation entries of the number of reservation entries and the third plurality of reservation entries of the number of reservation entries are the same plurality of reservation entries, and wherein the second plurality of reservation entries of the number of reservation entries and the fourth plurality of reservation entries of the number of reservation entries are the same plurality of reservation entries.

12. The apparatus of claim 9, wherein the first storage element is a first register and the second storage element is a second register.

\* \* \* \* \*